US012786778B2

(12) United States Patent
Mansour et al.

(10) Patent No.: US 12,786,778 B2
(45) Date of Patent: Nov. 3, 2026

(54) HIGH SPEED RAIL CELLULAR NETWORK SERVICE

(71) Applicant: T-MOBILE INNOVATIONS LLC, Overland Park, KS (US)

(72) Inventors: Nagi A. Mansour, Arlington, VA (US); Akin Ozozlu, McLean, VA (US); Ferdinand Bacay Saulon, Issaquah, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 452 days.

(21) Appl. No.: 18/220,188

(22) Filed: Jul. 10, 2023

(65) Prior Publication Data

US 2025/0024304 A1 Jan. 16, 2025

(51) Int. Cl.

*H04W 28/02* (2009.01)
*H04L 5/00* (2006.01)
*H04W 72/0453* (2023.01)

(52) U.S. Cl.

CPC ....... *H04W 28/0226* (2013.01); *H04L 5/0048* (2013.01); *H04W 72/0453* (2013.01)

(58) Field of Classification Search

CPC ......... H04W 28/0226; H04W 72/0453; H04W 36/00835; H04W 84/005; H04W 36/324; H04L 5/0048

See application file for complete search history.

(56) References Cited

U.S. PATENT DOCUMENTS

2014/0162652 A1* 6/2014 Kang .................. H04W 36/324 455/436
2016/0047884 A1* 2/2016 Zhang .................. H04B 7/0617 342/458
2019/0159102 A1* 5/2019 Ryu .................. H04W 36/0055
2019/0253899 A1* 8/2019 Shi ........................... H01Q 3/34
2019/0306789 A1* 10/2019 Wu .................... H04Q 11/0478
2022/0132401 A1* 4/2022 Legg .................... H04B 7/0897
2023/0268958 A1* 8/2023 Zhang ...................... H04B 7/01 370/252
2024/0186697 A1* 6/2024 Kalavakuru ........... H01Q 9/045
2024/0414516 A1* 12/2024 Wu ......................... H04W 4/42
2024/0430024 A1* 12/2024 Lo ...................... H04B 7/06952
2025/0133575 A1* 4/2025 Maaref ................. H04L 5/0044
2025/0233621 A1* 7/2025 Puducheri Sundaravaradhan ....... H04B 7/024

* cited by examiner

*Primary Examiner* — Yu-Wen Chang
(74) *Attorney, Agent, or Firm* — Shook Hardy & Bacon L.L.P.

(57) ABSTRACT

Methods and systems for providing mobile broadband services to high speed rail are provided. The method begins with determining that a user equipment (UE) is moving at a speed between a first threshold and a second threshold between a first location and a second location. The first and second thresholds may be selected to encompass typical speed ranges of high speed rail operation. Next, the method continues with identifying a set of access points between the first location and the second location. Then, the method continues with predicting an access point from the set of access points at which to transmit data to the access point. Because high speed rail uses a fixed track, the predicting may be performed in advance. The method concludes with dynamically selecting the access point from the set of access points based on at least one predefined antenna steering pattern to maintain antenna bandwidth.

20 Claims, 5 Drawing Sheets

HIGH SPEED RAIL CELLULAR NETWORK SERVICE

BACKGROUND

High speed rail is a rail system that operates at significantly higher speeds than traditional rail service. There is no worldwide standard speed for high speed rail, typically rail lines built to handle speeds above 155 mph or upgraded lines with speeds in excess of 124 mph are considered to be high speed rail. Beginning with Japan's Tokaido Shinkansen, known as the "bullet train," high speed rail systems have been deployed in many countries around the world, including France, Germany, Italy, Spain, and others. In the United States planning has been underway for decades. High speed rail poses challenges to network operators due to the speed the trains travel. While networks manage handover for user equipment (UE) traveling on highways, the speed of travel is significantly less than the speeds most high speed rail uses. Customary handover processes fail when the UE is traveling on a high speed rail system.

SUMMARY

A high-level overview of various aspects of the present technology is provided in this section to introduce a selection of concepts that are further described below in the detailed description section of this disclosure. This summary is not intended to identify key or essential features of the claimed subject matter, nor is it intended to be used as an aid in isolation to determine the scope of the claimed subject matter.

According to aspects herein, methods and systems for providing mobile broadband services to high speed rail are provided. The method begins with determining that a user equipment (UE) is moving at a speed between a first threshold and a second threshold between a first location and a second location. The first and second thresholds may be selected to encompass typical speed ranges of high speed rail operation. Next, the method continues with identifying a set of access points between the first location and the second location. Then, the method continues with predicting an access point from the set of access points at which to transmit data to the access point. Because high speed rail uses a fixed track, the predicting may be performed in advance. The method concludes with dynamically selecting the access point from the set of access points based on at least one predefined antenna steering pattern to maintain antenna bandwidth.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

Figure 1:
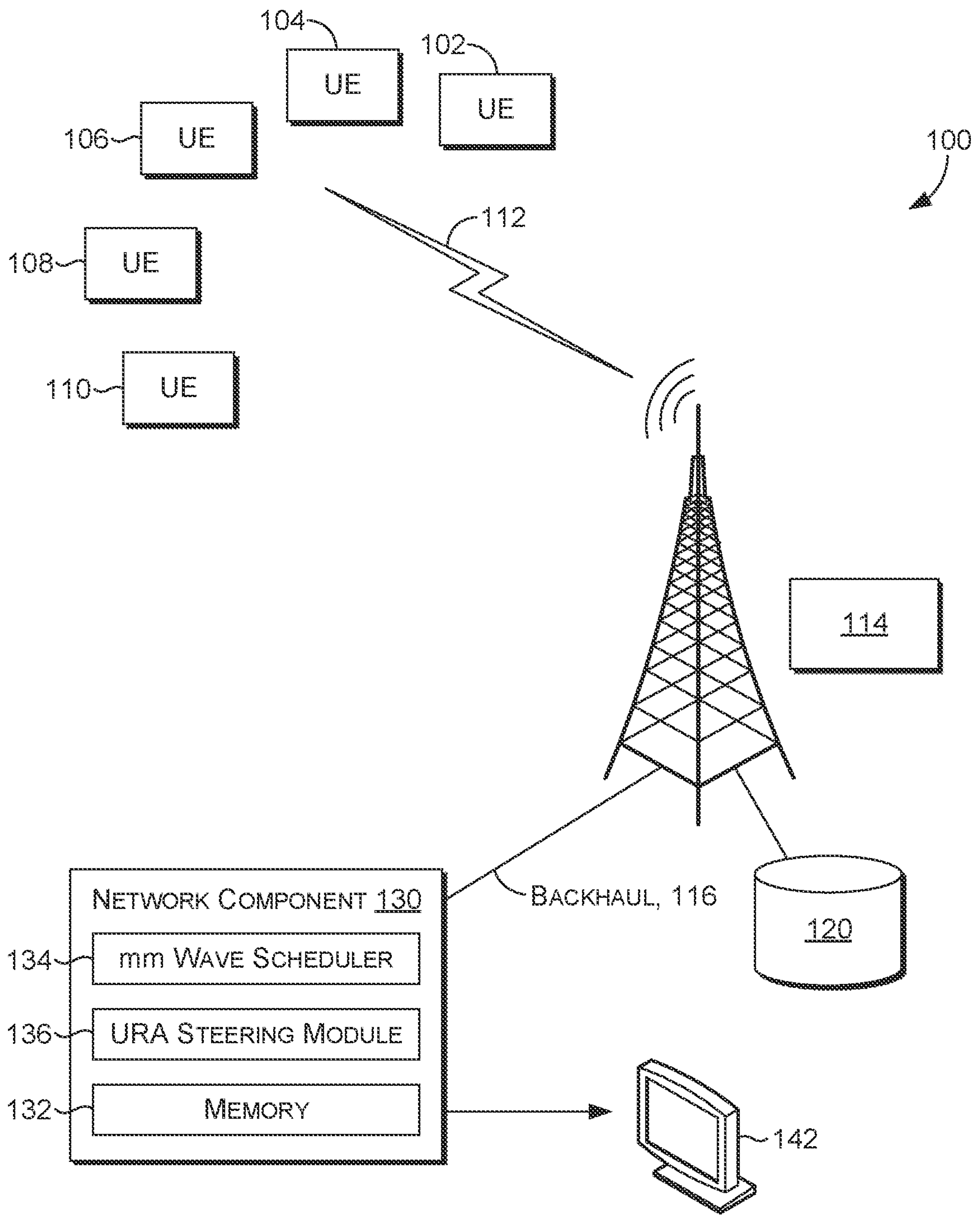
FIG. 1 depicts a diagram of an exemplary network environment in which implementations of the present disclosure may be employed, in accordance with aspects herein.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure.

High speed rail poses challenges to network operators because of the high speeds at which the trains travel. Networks are capable of managing handover between access points for UEs traveling on highways, however, the much higher speeds of high speed rail may require the use of millimeter wave spectrum, or extremely high frequency (EHF). The EHF frequencies provide higher data rates and use small cells for WiFi and cellular networks. In addition, the smaller size of EHF antennas makes them suitable for mounting on a high speed train.

Millimeter wave technology may be implemented in a single frequency network (SFN) where all transmitters from one SFN cell broadcast over a single frequency. On a high speed train, all transmitters on a train mounted access point may broadcast toward an access point similarly equipped that is located along the high speed train route. Providing enhanced mobile broadband (EMBB) services on high speed trains may include the use of beamforming to mitigate high propagation losses that occur in mm wave frequency bands. A beam switching method may leverage the position of the high speed train to adapt beam design information to each sector of an access point. This beam information may be modified as needed as the high speed train moves along the track, moving between locations and past multiple mm wave access points. High speed train position information is provided by the fixed track position and may be used in conjunction with beamforming techniques that allow antenna beam modification as the location of the high speed train changes.

Further, various technical terms are used throughout this description. An illustrative resource that fleshes out various aspects of these terms can be found in Newton's Telecom Dictionary, 32$^{nd}$ Edition (2022).

Embodiments of the present technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a traditional telecommunications network employs a plurality of access points (i.e., access point, node, cell sites, cell towers) to provide network coverage. The access points are employed to broadcast and transmit transmissions to user devices of the telecommunications network. An access point may be considered to be a portion of an access point that may comprise an antenna, a radio, and/or a controller. In aspects, an access point is defined by its ability to communicate with a user equipment (UE), such as a wireless communication device (WCD), according to a single protocol (e.g., 3G, 4G, LTE, 5G, and the like); however, in other aspects, a single access point may communicate with a UE according to multiple protocols. As used herein, an access point may comprise one access point or more than one access point. Factors that can affect the telecommunications transmission include, e.g., location and size of the access points, and frequency of the transmission, among other factors. The access points are employed to broadcast and transmit transmissions to user devices of the telecommunications network. Traditionally, the access point establishes uplink (or downlink) transmission with a mobile handset over a single frequency that is exclusive to that particular uplink connection (e.g., an LTE connection with an EnodeB). The access point may include one or more sectors served by individual transmitting/receiving components associated with the access point (e.g., antenna arrays controlled by an EnodeB). These transmitting/receiving components together form a multi-sector broadcast arc for communication with mobile handsets linked to the access point.

As used herein, "access point" is one or more transmitters or receivers or a combination of transmitters and receivers, including the accessory equipment, necessary at one location for providing a service involving the transmission, emission, and/or reception of radio waves for one or more specific telecommunication purposes to a mobile station (e.g., a UE). The term/abbreviation UE (also referenced herein as a user device or wireless communications device (WCD)) can include any device employed by an end-user to communicate with a telecommunications network, such as a wireless telecommunications network. A UE can include a mobile device, a mobile broadband adapter, or any other communications device employed to communicate with the wireless telecommunications network. A UE, as one of ordinary skill in the art may appreciate, generally includes one or more antennas coupled to a radio for exchanging (e.g., transmitting and receiving) transmissions with a nearby access point. A UE may be, in an embodiment, similar to device 500 described herein with respect to FIG. 5.

As used herein, UE (also referenced herein as a user device or a wireless communication device) can include any device employed by an end-user to communicate with a wireless telecommunications network. A UE can include a mobile device, a mobile broadband adapter, a fixed location or temporarily fixed location device, or any other communications device employed to communicate with the wireless telecommunications network. For an illustrative example, a UE can include cell phones, smartphones, tablets, laptops, small cell network devices (such as micro cell, pico cell, femto cell, or similar devices), and so forth. Further, a UE can include a sensor or set of sensors coupled with any other communications device employed to communicate with the wireless telecommunications network; such as, but not limited to, a camera, a weather sensor (such as a rain gage, pressure sensor, thermometer, hygrometer, and so on), a motion detector, or any other sensor or combination of sensors. A UE, as one of ordinary skill in the art may appreciate, generally includes one or more antennas coupled to a radio for exchanging (e.g., transmitting and receiving) transmissions with a nearby access point or access point.

In aspects, a UE provides UE data including location and channel quality information to the wireless communication network via the access point. Location information may be based on a current or last known position utilizing GPS or other satellite location services, terrestrial triangulation, an access point's physical location, or any other means of obtaining coarse or fine location information. Channel quality information may indicate a realized uplink and/or downlink transmission data rate, observed signal-to-interference-plus-noise ratio (SINR), reference signal received quality (RSRQ), and/or signal strength at the user device, or throughput of the connection. Channel quality information may be provided via, for example, an uplink pilot time slot, downlink pilot time slot, sounding reference signal, channel quality indicator (CQI), rank indicator, precoding matrix indicator, or some combination thereof. Channel quality information may be determined to be satisfactory or unsatisfactory, for example, based on exceeding or being less than a threshold. Location and channel quality information may take into account the user device capability, such as the number of antennas and the type of receiver used for detection. Processing of location and channel quality information may be done locally, at the access point or at the individual antenna array of the access point. In other aspects, the processing of said information may be done remotely.

The UE data may be collected at predetermined time intervals measured in milliseconds, seconds, minutes, hours, or days. Alternatively, the UE data may be collected continuously. The UE data may be stored at a storage device of the UE, and may be retrievable by the UE's primary provider as needed and/or the UE data may be stored in a cloud based storage database and may be retrievable by the UE's primary provider as needed. When the UE data is stored in the cloud based storage database, the data may be stored in association with a data identifier mapping the UE data back to the UE, or alternatively, the UE data may be collected without an identifier for anonymity.

A first aspect of the present disclosure provides a method for providing multiple broadband services to high speed rail in a network. The method begins with determining that a UE is moving at a speed between a first threshold and a second threshold between a first location and a second location. Next, a set of access points between the first location and the second location is identified. Then, the method continues with predicting an access point from the set of access points at which to transmit data to the access point. Then, the method concludes with dynamically selecting the access point from the set of access points based on at least one predefined antenna steering pattern to maintain antenna bandwidth.

A second aspect of the present disclosure provide a method for providing mobile broadband services to at least one UE on high speed rail in a network. The method begins with transmitting, by the at least one UE, a network connection request to a UE module, the UE module moving at a speed between a first threshold and a second threshold. A network connection is then established with the UE. The UE may then transmit at least one uplink message to the UE module and the UE module transmits the uplink message to an access point that was dynamically selected based on at least one predefined antenna steering pattern to maintain antenna bandwidth.

Another aspect of the present disclosure is directed to a non-transitory computer storage media storing computer-usable instructions that cause the processors to determine that a UE is moving at a speed between a first threshold and a second threshold between a first location and a second location. The processors then identify a set of access points between the first location and the second location. Next, the processors predict an access point from the set of access points at which to transmit data to the access point. Then the processors dynamically select the access point from the set of access points based on at least one predefined antenna steering pattern to maintain antenna bandwidth.

FIG. 1 illustrates an example of a network environment 100 suitable for use in implementing embodiments of the present disclosure. The network environment 100 is but one example of a suitable network environment and is not intended to suggest any limitation as to the scope of use or functionality of the disclosure. Neither should the network environment 100 be interpreted as having any dependency or requirement to any one or combination of components illustrated.

Network environment 100 includes user devices (UE) 102, 104, 106, 108, and 110, access point 114 (which may be a cell site, access point, or the like), and one or more communication channels 112. A UE may also be a high speed train operating in a high speed rail line. For high speed rail applications the UE may incorporate or connect to a uniform rectangular array antenna to provide network connectivity. Network subscribers on the high speed train may access network services by connecting with a high speed rail service offered on high speed rail. The communication channels 112 can communicate over frequency bands assigned to the carrier. In network environment 100, user devices may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the computing device 500) that communicates via wireless communications with the access point 114 in order to interact with a public or private network.

Figure 5:
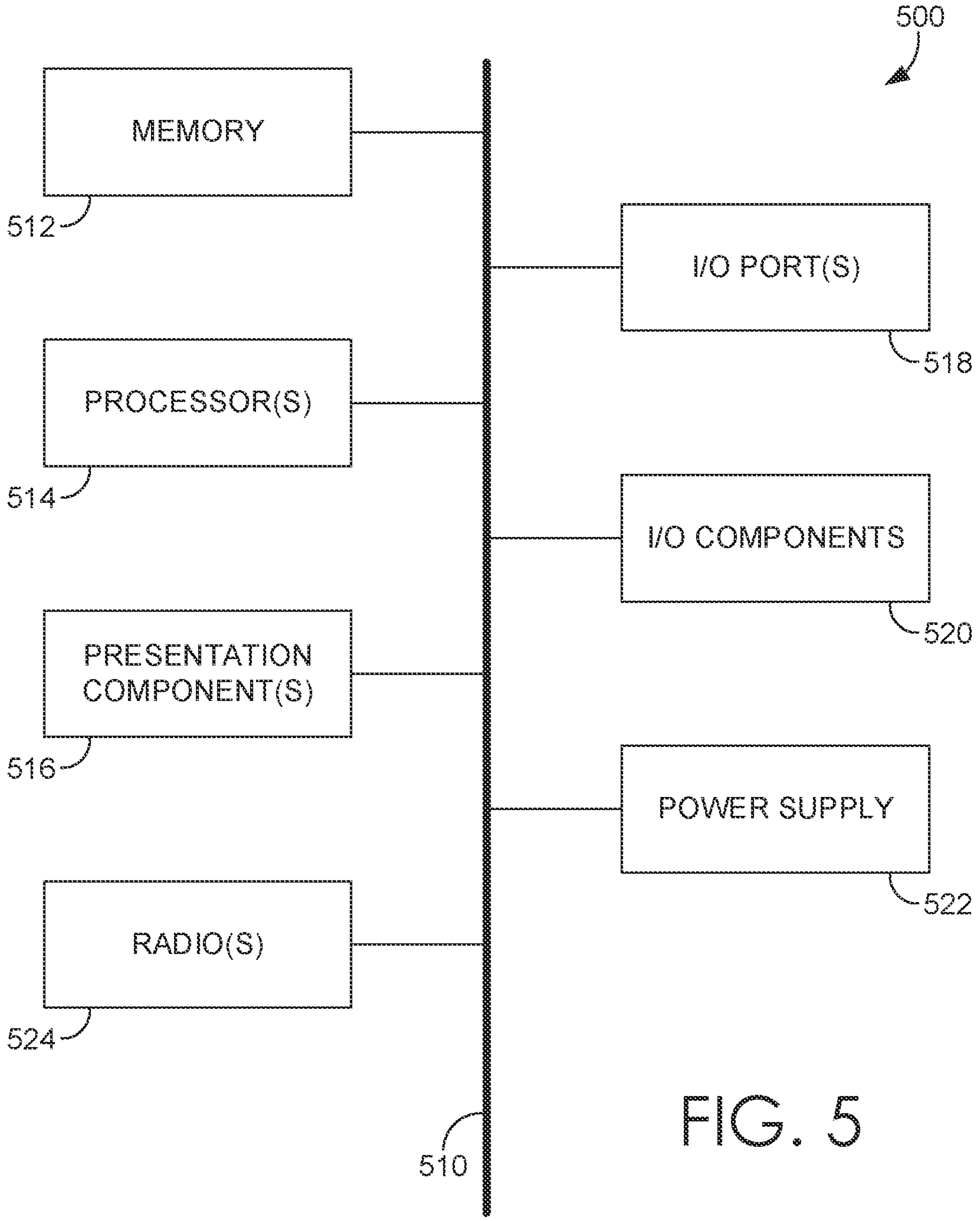
FIG. 5 depicts an exemplary computing device suitable for use in implementations of the present disclosure, in accordance with aspects herein.

In some aspects, each of the UEs 102, 104, 106, 108, and 110 may correspond to computing device 500 in FIG. 5. Thus, a UE can include, for example, a display(s), a power source(s) (e.g., a battery), a data store(s), a speaker(s), memory, a buffer(s), a radio(s) and the like. In some implementations, for example, a UEs 102, 104, 106, 108, and 110 comprise a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, 6G, LTE, CDMA, or any other type of network. In some cases, UEs 102, 104, 106, 108, and 110 in network environment 100 can optionally utilize one or more communication channels 112 to communicate with other computing devices (e.g., a mobile device(s), a server(s), a personal computer(s), etc.) through access point 114.

The network environment 100 may be comprised of a telecommunications network(s), or a portion thereof. A telecommunications network might include an array of devices or components (e.g., one or more access points), some of which are not shown. Those devices or components may form network environments similar to what is shown in FIG. 1, and may also perform methods in accordance with the present disclosure. Components such as terminals, links, and nodes (as well as other components) can provide connectivity in various implementations. Network environment 100 can include multiple networks, as well as being a network of networks, but is shown in more simple form so as to not obscure other aspects of the present disclosure. Network environment 100 may comprise equipment placed in network operator facilities, but may also comprise equipment located at a customer's premises, known as customer premises equipment (CPE).

The one or more communication channels 112 can be part of a telecommunication network that connects subscribers to their immediate telecommunications service provider (i.e., home network carrier). In some instances, the one or more communication channels 112 can be associated with a telecommunications provider that provides services (e.g., 3G network, 4G network, LTE network, 5G network, 6G, and the like) to user devices, such as UEs 102, 104, 106, 108, and 110. For example, the one or more communication channels may provide voice, SMS, and/or data services to UEs 102, 104, 106, 108, and 110, or corresponding users that are registered or subscribed to utilize the services provided by the telecommunications service provider. The one or more communication channels 112 can comprise, for example, a 1× circuit voice, a 3G network (e.g., CDMA, CDMA2000, WCDMA, GSM, UMTS), a 4G network (WiMAX, LTE, HSDPA), or a 5G network or a 6G network. The telecommunication network may also provide services using MU-MIMO techniques.

In some implementations, access point 114 is configured to communicate with a UE, such as UEs 102, 104, 106, 108, and 110, that are located within the geographic area, or cell, covered by radio antennas of access point 114. The antennas of access point 114 may be uniform rectangular arrays suitable for use in high speed rail applications using millimeter wave technology. Access point 114 may include one or more access points, base transmitter stations, radios, antennas, antenna arrays, power amplifiers, transmitters/receivers, digital signal processors, control electronics, GPS equipment, and the like. In particular, access point 114 may selectively communicate with the user devices using dynamic beamforming.

As shown, access point 114 is in communication with a network component 130 and at least a network database 120 via a backhaul channel 116. As the UEs 102, 104, 106, 108, and 110 collect individual signal information, the signal information can be automatically communicated by each of the UEs 102, 104, 106, 108, and 110 to the access point 114. Access point 114 may store the signal information and data communicated by the UEs 102, 104, 106, 108, and 110 at a network database 120. Alternatively, the access point 114 may automatically retrieve the status data from the UEs 102, 104, 106, 108, and 110, and similarly store the data in the network database 120. The signal information and data may be communicated or retrieved and stored periodically within a predetermined time interval which may be in seconds, minutes, hours, days, months, years, and the like. With the incoming of new data, the network database 120 may be refreshed with the new data every time, or within a predetermined time threshold so as to keep the status data stored in the network database 120 current. For example, the data may be received at or retrieved by the access point 114 every 10 minutes and the data stored at the network database 120 may be kept current for 30 days, which means that status data that is older than 30 days would be replaced by newer status data at 10 minute intervals. As described above, the status data collected by the UEs 102, 104, 106, 108, and 110 can include, for example, service state status, the respective UE's current geographic location, a current time, a strength of the wireless signal, available networks, and the like.

The network component 130 comprises a memory 132, an artificial intelligence a millimeter wave (mm wave) scheduler 134, and a uniform rectangular array (URA) steering module 136. All determinations, calculations, and data further generated by the mm wave scheduler 134 and URA steering module 136 may be stored at the memory 132 and also at the data store 140. Although the network component 130 is shown as a single component comprising the memory 132, mm wave scheduler 134, URA steering module 136, and the data store 140, it is also contemplated that each of the memory 132, the mm wave scheduler 134, and URA steering module 136 may reside at different locations, be its own separate entity, and the like, within the home network carrier system.

The network component 130 is configured to retrieve signal quality metrics and carrier loading metrics from the access point 114 or one of the UEs, 102, 104, 106, 108, and 110. Signal quality metrics can include any one or more of multiple metrics, such as signal-to-interference and noise (SINR), reference signal received power (RSRP), and reference signal received quality (RSRQ). The network component 130 can also track uplink and downlink user traffic. The mm wave scheduler 134 can observe data usage on multiple mm wave frequencies over the network using measurement metrics such as SINR, RSRP, and RSRQ. The mm wave scheduler 134 and URA steering module 136 may each be located in a central office or other centralized location, but may also be mounted on a high speed train. For a distributed radio access network, the mm wave scheduler 134 can be located at the access point 114. The mm wave scheduler 134, acting in conjunction with the URA steering module 136 may then ensure that the UEs 102, 104, 106, 108, and 110, which may be high speed trains, receive network services.

Millimeter wave spectrum have wavelengths between 10 millimeters (30 GHz) and 1 millimeter (300 GHz). It may also be known as the extremely high frequency (EHF) band by the International Telecommunication Union (ITU). Millimeter wave enables higher data rates than those frequencies used for WiFi and current cellular networks. Propagation restrictions dictate the use of small cell sizes for WiFi and cellular networks. Small cells also facilitate the reuse of channels across the WLAN coverage area. Antennas for millimeter wave devices are smaller than for other devices, making mounting on a high speed rail application feasible.

When implemented, mm wave may be used in a single frequency network (SFN). In a SFN all transmitters from one SFN cell broadcast over the same frequency. In a high speed rail applications, all transmitters on an access point will broadcast toward a high speed train using a single frequency. A SFN can exhibit network gain, where signals from more than one transmitter contribute toward a higher received signal with lower variability from lone location to another, features which make mm wave frequencies suitable for use in high speed rail applications. EMBB), which relies on high data rates. SFNs are also suitable for use with enhanced mobile broadband (These qualities can improve coverage compared with a multi-frequency network, where all transmitters broadcast over a different frequency.

A SFN may use dynamic point selection, a downlink coordinates multipoint technique that switches the serving data transmission point of a UE dynamically among the UEs cooperating set of transmission points without requiring a cell handover. For a high speed rail network, the cooperating set of transmission points may be a set of access points located to provide service along high speed rail lines. In addition, dynamic point selection provides performance improvement due to transmission point selection diversity gain and dynamic UE load balancing.

Figure 2:
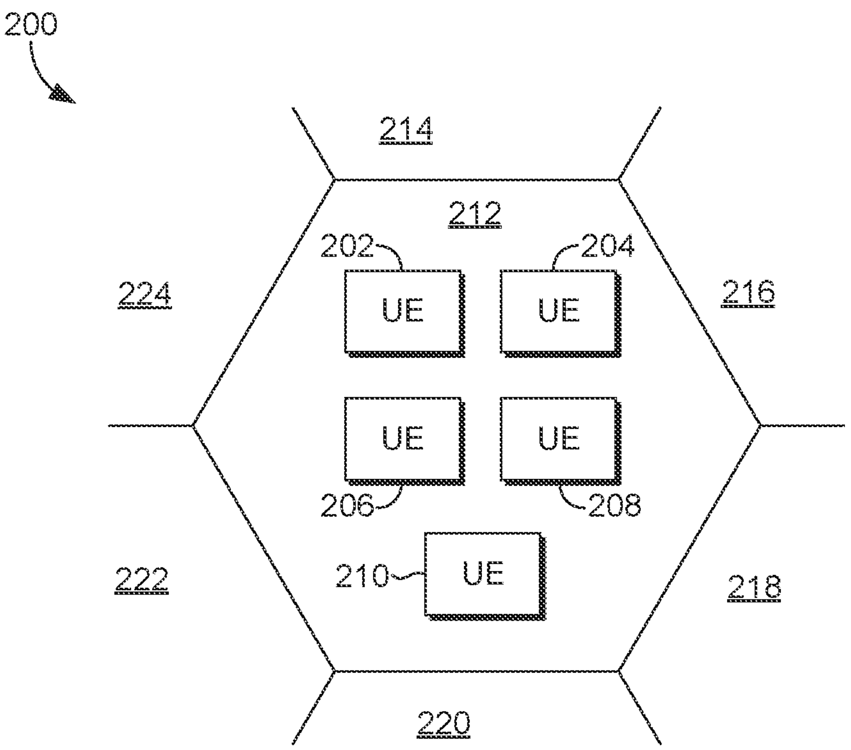
FIG. 2 depicts a cellular network suitable for use in implementations of the present disclosure, in accordance with aspects herein.

FIG. 2 depicts a cellular network suitable for use in implementations of the present disclosure, in accordance with aspects herein. For example, as shown in FIG. 2, each geographic area in the plurality of geographic areas may have a hexagonal shape such as hexagon representing a geographic area 200 having cell sites 212, 214, 216, 218, 220, 222, 224, each including access point 114, backhaul channel 116, antenna for sending and receiving signals over communication channels 112, network database 120 and network component 130. The size of the geographic area 200 may be predetermined based on a level of granularity, detail, and/or accuracy desired for the determinations/calculations done by the systems, computerized methods, and computer-storage media. A plurality of UEs may be located within each geographic area collecting UE data within the geographic area at a given time. For example, as shown in FIG. 2, UEs 202, 204, 206, 208, and 210, may be located within geographic area 200 collecting UE data that is useable by network component 130, in accordance with aspects herein. UEs 202, 204, 206, 208, and 210 can move within the cell currently occupying, such as cell site 212 and can move to other cells such as adjoining cell sites 214, 216, 218, 220, 222 and 224.

Providing EMBB service on high speed rail may use mm wave frequencies, such as 28 GHz and 60 GHZ. These EHF bands have become more likely to support high speed rail networks because the sub-6 GHz bands have become quite crowded and it has been difficult to support high data rate communications. Mm wave bands have large available bandwidth for mobile broadband services. Part of determining which frequency bands are suitable for high speed rail involve evaluating performance at different bandwidths and train speeds. The goal is to provide high data rates and seamless connectivity using line of sight (LoS) even while using a narrow beamwidth on both frequency bands. The beamwidth may be as narrow as 12 degrees.

High speed trains are expected to be equipped with sensors, cameras, light detection, and ranging scanners to collect information on train position, speed, direction of travel, and temperature. This information may be exchanged between the train, which is considered a UE for mobile network service, and the access point. As high speed train technology advances, so does the track technology the trains run on. Technical advances in track design include sensors for positive train control, train monitoring. Both the high speed trains and tracks may generate significant amounts of data to be shared over the network. The large amount of data to be generated and shared requires reliable, stable, and high throughput links between the access point and the UE.

The wider bandwidth at mm wave frequencies allows for higher data rates that are needed by high speed rail network services. At the same time, the high attenuation may complicate providing the reliable links between the transmitter and the receiver. This is especially true for the provision of EMBB services at the speeds of high speed rail service. Beamforming may be used to mitigate the high propagation losses that occur in mm wave frequency bands. Using narrow beams allows high data rates to be provided, but does necessitate frequent beam alignment. Given the high speeds of high speed trains, beam alignment would require significant beam alignment overhead.

Reducing beam alignment overhead may incorporate a beam switching method which leverages high speed train position. High speed train position information is readily available due to the predetermined train track position. This detailed location information may be used in conjunction to beam design information. Beam design information may be adapted to each sector and modified as needed as the location of the high speed train changes.

Figure 3:
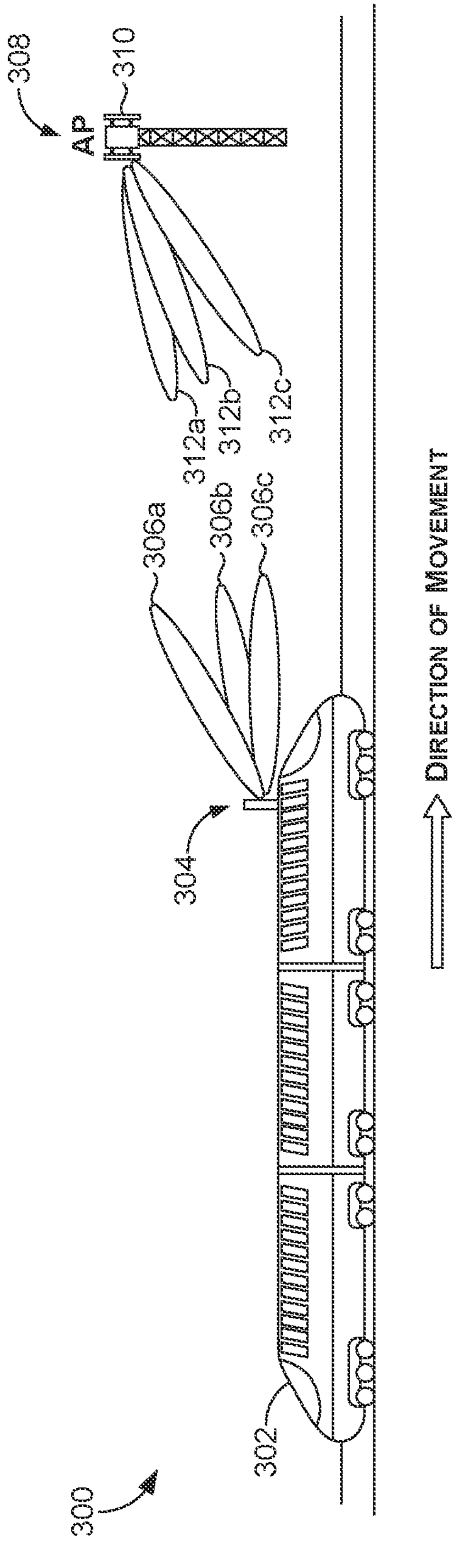
FIG. 3 depicts a mm wave system for providing mobile broadband services for high speed rail, in accordance with aspects herein.

FIG. 3 depicts a mm wave system for providing mobile broadband services for high speed rail, in accordance with aspects herein. The mm wave system 300 includes a high speed train 302, which has a UE module 304 mounted on the train. The UE module 304 transmits using a uniform angular array antenna. The UE module 304 may transmit and receive using multiple antenna beams 306 *a*, 306 *b*, and 306 *c*. The access point 308 also has an antenna module 310 that may transmit and receive using multiple antenna beams 312 *a*, 312 *b*, and 312 *c*. In operation, the access point 308 and the UE module 304 may use mm wave frequencies such as 28 GHz and 60 GHz. Other frequencies in the mm wave bands may also be used. Both the access point 308 and the UE module 304 use uniform angular arrays which allow for beam steering with predefined azimuth and elevation half-power beamwidths. The predefined azimuth and elevation half power beamwidths may include 12 degrees, 20 degrees, and 32 degrees, considered at both the high speed train and the access point. Antenna height may be set to six meters for the access point 308 and two meters for the UE module. The azimuth and elevation angles may be set to the same values.

Figure 4:
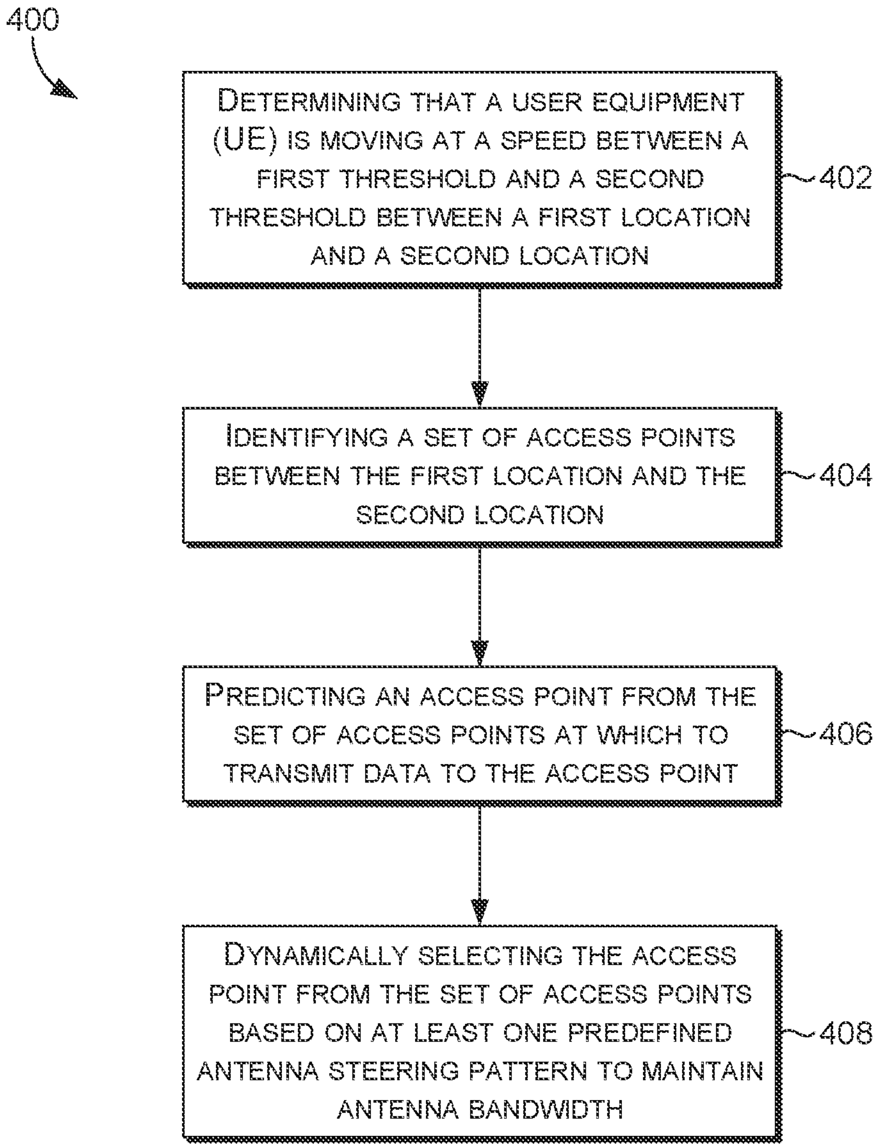
FIG. 4 depicts a flow diagram of an exemplary method for cellular service for high speed rail in a network, in accordance with aspects herein.

FIG. 4 depicts a flow diagram of an exemplary method for cellular service for high speed rail in a network, in accordance with aspects herein. The method 400 begins in step 402 with determining that a UE is moving at a speed between a first threshold and a second threshold between a first location and a second location. Then in step 404 continues with identifying a set of access points between the first location and the second location. Once the set of access points has been identified the method continues with step 406, predicting an access point from the set of access points at which to transmit data to the access point. The method then concludes in step 408 with dynamically selecting the access point from the set of access points based on at least one predefined antenna steering pattern to maintain antenna bandwidth.

The first and second speed thresholds may be selected to reflect operating speeds of high speed trains. For example, the first threshold may be selected to be 124 miles per hour, which is a generally accepted lowest operating speed for a train to be considered high speed rail. The second threshold may be selected as an upper limit, such as 200 miles per hour. While some high speed trains have greatly exceeded 200 miles per hour, such speeds are unusual and most high speed trains operate with a top speed of 200 miles per hour or less.

The predefined antenna steering pattern is used with a uniform rectangular array antenna. Such an antenna has a profile suited for installation on a high speed train. The predefined antenna steering pattern may be based on a location of at least one access point in the set of access points. The predefined antenna steering pattern may be based on a location of at least one access point in the set of access points. In addition, the predefined antenna steering pattern may comprise a predefined azimuth half-power bandwidth and a predefined elevation half-power bandwidth. The predefined azimuth half-power bandwidth and the predefined elevation half-power bandwidth may be based on a location of the UE module. The methods described herein may be transmitted over a single frequency network and a millimeter wave frequency.

A further method provides a method for providing mobile broadband services to at least one UE on high speed rail in a network. The method begins when the UE transmits a network connection request to a UE module that may be mounted on the high speed train that is moving at a speed between a first threshold and a second threshold. The at least one UE then establishes an network connection with the UE module and then begins transmitting at least one uplink message to the UE module. The UE module in turn transmits the uplink message to an access point that was dynamically selected based on at least one predefined antenna steering pattern to maintain antenna bandwidth.

FIG. 5 depicts an exemplary computing device suitable for use in implementations of the present disclosure, in accordance with aspects herein. With continued reference to FIG. 5, computing device 500 includes bus 510 that directly or indirectly couples the following devices: memory 512, one or more processors 514, one or more presentation components 516, input/output (I/O) ports 518, I/O components 520, radio(s) 524, and power supply 522. Bus 510 represents what may be one or more busses (such as an address bus, data bus, or combination thereof). Although the devices of FIG. 5 are shown with lines for the sake of clarity, in reality, delineating various components is not so clear, and metaphorically, the lines would more accurately be grey and fuzzy. For example, one may consider a presentation component such as a display device to be one of I/O components 520. Also, processors, such as one or more processors 514, have memory. The present disclosure hereof recognizes that such is the nature of the art, and reiterates that FIG. 5 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 5 and refer to "computer" or "computing device."

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 512 includes computer-storage media in the form of volatile and/or nonvolatile memory. Memory 512 may be removable, nonremovable, or a combination thereof. Exemplary memory includes solid-state memory, hard drives, optical-disc drives, etc. Computing device 500 includes one or more processors 606 that read data from various entities such as bus 510, memory 512 or I/O components 520. One or more presentation components 516 present data indications to a person or other device. Exemplary one or more presentation components 516 include a display device, speaker, printing component, vibrating component, etc. I/O ports 518 allow computing device 500 to be logically coupled to other devices including I/O components 520, some of which may be built into computing device 500. Illustrative I/O components 520 include a microphone, joystick, game pad, satellite dish, scanner, printer, wireless device, etc.

The radio(s) 524 represents one or more radios that facilitate communication with a wireless telecommunications network. While a single radio 524 is shown in FIG. 5, it is contemplated that there may be more than one radio 524 coupled to the bus 510. Illustrative wireless telecommunications technologies include CDMA, GPRS, TDMA, GSM, and the like. The radio 524 may additionally or alternatively facilitate other types of wireless communications including Wi-Fi, WiMAX, LTE, 3G, 4G, LTE, 5G, NR, VOLTE, or other VoIP communications. As can be appreciated, in various embodiments, radio 524 can be configured to support multiple technologies and/or multiple radios can be utilized to support multiple technologies. A wireless telecommunications network might include an array of devices, which are not shown so as to not obscure more relevant aspects of the invention. Components such as a access point, a communications tower, or even access points (as well as other components) can provide wireless connectivity in some embodiments.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method for providing mobile broadband services to high speed rail, in a network, the method comprising:

determining that a user equipment (UE) is moving at a speed between a first threshold and a second threshold between a first location and a second location, wherein the UE is connected to a UE module;

identifying a set of access points between the first location and the second location;

predicting an access point from the set of access points at which to transmit data to the access point; and dynamically selecting the access point from the set of access points based on at least one predefined antenna steering pattern to maintain antenna bandwidth, wherein the at least one predefined antenna steering pattern comprises a predefined azimuth half-power beamwidth and a predefined elevation half-power beamwidth, and wherein both of the UE module and the access point utilize a same value for the predefined elevation half-power beamwidth and utilize a same value for the predefined elevation azimuth half-power beamwidth.

2. The method of claim 1, wherein the at least one predefined antenna steering pattern is selected from a plurality of predefined antenna steering patterns associated with one or more sectors of the access point, wherein the at least one predefined antenna steering pattern is selected based on a sector of the access point corresponding to a location of the UE module.

3. The method of claim 1, wherein the first threshold is at least 124 miles per hour, and wherein the second threshold is above 200 miles per hour.

4. The method of claim 1, wherein the at least one predefined antenna steering pattern is for a uniform rectangular array antenna.

5. The method of claim 4, wherein the at least one predefined antenna steering pattern is based on a location of at least one access point in the set of access points.

6. The method of claim 5, wherein the location of the at least one access point is relative to a high speed train track.

7. The method of claim 1, wherein the predefined azimuth half-power beamwidth and the predefined elevation half-power beamwidth are set to any one or more of 12 degrees, 20 degrees, or 32 degrees.

8. The method of claim 1, wherein the access point uses a single frequency network.

9. The method of claim 7, wherein the predefined azimuth half-power beamwidth and the predefined elevation half-power beamwidth are set to the same value.

10. The method of claim 8, wherein the single frequency network operates on a millimeter wave frequency.

11. A method for providing mobile broadband services to at least one user equipment (UE) on high speed rail in a network, the method, comprising:

transmitting, by the at least one UE, a network connection request to a UE module, the at least one UE and the UE module moving at a speed between a first threshold and a second threshold;

at the at least one UE, establishing a network connection with the UE module; and transmitting at least one uplink message to the UE module, wherein the UE module transmits the at least one uplink message to an access point that was dynamically selected based on at least one predefined antenna steering pattern to maintain antenna bandwidth, wherein the at least one predefined antenna steering pattern comprises a predefined azimuth half-power beamwidth and a predefined elevation half-power beamwidth, and wherein both of the UE module and the access point utilize a same value for the predefined elevation half-power beamwidth and utilize a same value for the predefined azimuth half-power beamwidth.

12. The method of claim 11, further comprising receiving, by the at least one UE, at least one downlink message from the network via the UE module.

13. A non-transitory computer storage media storing computer-usable instructions that, when used by one or more processors, cause the one or more processors to:

determine that a user equipment (UE) is moving at a speed between a first threshold and a second threshold between a first location and a second location, wherein the UE is connected to a UE module;

identify a set of access points between the first location and the second location;

predict an access point from the set of access points at which to transmit data to the access point; and dynamically select the access point from the set of access points based on at least one predefined antenna steering pattern to maintain antenna bandwidth, wherein the at least one predefined antenna steering pattern comprises a predefined azimuth half-power beamwidth and a predefined elevation half-power beamwidth, and wherein the predefined elevation half-power beamwidth and the predefined azimuth half-power beamwidth are set to a same value at both of the access point and the UE module.

14. The non-transitory computer storage media of claim 13, wherein the first threshold is at least 124 miles per hour.

15. The non-transitory computer storage media of claim 13, wherein the second threshold is above 200 miles per hour.

16. The non-transitory computer storage media of claim 13, wherein the at least one predefined antenna steering pattern is for a uniform rectangular array antenna.

17. The non-transitory computer storage media of claim 16, wherein the at least one predefined antenna steering pattern is based on a location of at least one access point in the set of access points.

18. The non-transitory computer storage media of claim 13 wherein the predefined azimuth half-power beamwidth and the predefined elevation half-power beamwidth are set to one of 12 degrees, 20 degrees, or 32 degrees.

19. The non-transitory computer storage media of claim 13, wherein the predicting of the access point is performed in advance of the determining based on pre-determined location information of a route, wherein each access point comprises a plurality of sectors, and wherein the at least one predefined antenna steering pattern is designed based on a sector of the access point, and wherein the sector of the access point corresponds to a location of the UE module relative to the pre-determined location information of the route.

20. The non-transitory computer storage media of claim 13, wherein the access point uses at least one millimeter wave frequency.

* * * * *